United States Patent
Park et al.

(10) Patent No.: US 12,148,422 B2
(45) Date of Patent: Nov. 19, 2024

(54) ELECTRONIC APPARATUS AND CONTROL METHOD THEREOF

(71) Applicant: Samsung Electronics Co., Ltd., Suwon-si (KR)

(72) Inventors: Jihun Park, Suwon-si (KR); Dongheon Seok, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 830 days.

(21) Appl. No.: 17/131,009

(22) Filed: Dec. 22, 2020

(65) Prior Publication Data

US 2021/0193144 A1    Jun. 24, 2021

(30) Foreign Application Priority Data

Dec. 23, 2019 (KR) .......................... 10-2019-0172725

(51) Int. Cl.
  *G10L 15/22* (2006.01)
  *G10L 15/26* (2006.01)
  *H04N 21/422* (2011.01)

(52) U.S. Cl.
  CPC .............. *G10L 15/22* (2013.01); *G10L 15/26* (2013.01); *G10L 2015/223* (2013.01); *H04N 21/42203* (2013.01)

(58) Field of Classification Search
  CPC ........ G06F 3/167; G06F 40/295; G06F 40/30; G10L 15/22; G10L 15/26; G10L 2015/223; H04N 21/42203
  See application file for complete search history.

(56) References Cited

U.S. PATENT DOCUMENTS

| | | | | |
|---|---|---|---|---|
| 4,914,704 A | * | 4/1990 | Cole | G06F 40/232 704/235 |
| 7,260,529 B1 | * | 8/2007 | Lengen | G10L 15/22 704/E15.04 |
| 2013/0297307 A1 | * | 11/2013 | Paek | G10L 15/26 704/235 |
| 2017/0263248 A1 | * | 9/2017 | Gruber | G10L 15/02 |
| 2017/0263249 A1 | * | 9/2017 | Akbacak | G06F 21/00 |

FOREIGN PATENT DOCUMENTS

KR    10-0380538    4/2003

OTHER PUBLICATIONS

Extended European Search Report dated May 19, 2021 from European Application No. 20215293.0.
European Office Action dated Jun. 4, 2024, in European Application No. 20215293.0.

\* cited by examiner

*Primary Examiner* — Angela A Armstrong
(74) *Attorney, Agent, or Firm* — STAAS & HALSEY LLP

(57) ABSTRACT

Disclosed is an electronic apparatus. The electronic apparatus obtains a first character string comprising a previously defined character from first user utterance; recognizes a second character string, which is edited from the first character string based on a first edition command, as an input character, based on the first user utterance comprising the first edition command following the first character string; and performs edition with regard to the second character string based on second edition command, based on second user utterance comprising the second edition command without the first edition command.

20 Claims, 16 Drawing Sheets

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0172725 filed on Dec. 23, 2019 in the Korean Intellectual Property Office, the disclosure of which is incorporated by reference herein in its entirety.

BACKGROUND

Field

The disclosure relates to an electronic apparatus and a control method thereof, and more particularly to an electronic apparatus, in which a character string is edited according to a user's utterance, and a method of controlling the same.

Description of the Related Art

A user can control various functions of an electronic apparatus based on a voice recognition function. For example, in a case of a television (TV), when a user utters a channel number of a desired channel to watch, the TV recognizes the channel number and displays an image corresponding to the recognized channel number. Besides, a user may input a character based on the voice recognition function. For example, in a case where user account information, e.g. a password is input to the TV, when a user utters characters such as alphabets, digits, symbols, etc. contained in the password in units of individual letters, the TV recognizes the characters uttered in units of individual letters and receives the recognized characters as the password.

In a case where a wrong character is entered while the characters are input through the voice recognition function, when a user utters an edition command to edit the wrong character, the TV recognizes the edition command and edit the wrong character upon the recognized edition command. However, there are limits to the kind and number of recognizable edition commands, and the edition function based on the edition command is also simple. Therefore, utilization of the edition function is low, and convenience in using a character input based on the voice recognition function is also low.

SUMMARY

An aspect of the disclosure is to provide an electronic apparatus and a control method thereof, in which more various and extensive edition commands can be issued for a wrong character input during a character input using a voice recognition function, thereby improving utilization of an edition function based on voice recognition.

According to an embodiment of the disclosure, there is provided an electronic apparatus including: a processor configured to: obtain a first character string comprising a previously defined character from first user utterance; recognize a second character string, which is edited from the first character string based on a first edition command, as an input character, based on the first user utterance comprising the first edition command following the first character string; and perform edition with regard to the second character string based on second edition command, based on second user utterance comprising the second edition command without the first edition command.

The first edition command comprises a command issued to delete a character contained in the first character string.

Commands recognizable as the second edition command are more than commands recognizable as the first edition command.

The processor is configured to: recognize the second edition command based on a voice recognition engine; and recognize a command for controlling the electronic apparatus based on the voice recognition engine.

The processor is configured to recognize the first character string and the first edition command with regard to the first user utterance received in a character input mode activated based on a previously defined event.

The processor is configured to identify whether the second edition command is contained in the second user utterance received while the character input mode is being activated.

The processor is configured to: activate the character input mode based on a first event; and terminate the activation of the character input mode based on a second event.

The processor is configured to activate the character input mode based on a received user input.

Based on the second user utterance comprising a third character string comprising the previously defined character, the processor is configured to perform the edition (i.e. edit) with regard to the second character string based on the second edition command without recognizing the third character string as the input character.

The processor is configured to control the display to display the second character string recognized as the input character but not to display the third character string not recognized as the input character.

The processor is configured to: obtain a fourth character string comprising the previously defined character from third user utterance; and recognize the fourth character string as the input character, based on the third user utterance comprising no first edition command following the fourth character string.

The processor is configured not to identify whether the second user utterance comprises the second edition command, based on the first user utterance comprising the first edition command.

According to another embodiment of the disclosure, there is provided a method of controlling an electronic apparatus, comprising: obtaining a first character string comprising a previously defined character from first user utterance; recognizing a second character string, which is edited from the first character string based on a first edition command, as an input character, based on the first user utterance comprising the first edition command following the first character string; and performing edition with regard to the second character string based on second edition command, based on second user utterance comprising the second edition command without the first edition command.

The first edition command comprises a command issued to delete a character contained in the first character string.

Commands recognizable as the second edition command are more than commands recognizable as the first edition command.

The performing the edition comprises: recognizing the second edition command based on a voice recognition engine; and recognizing a command for controlling the electronic apparatus based on the voice recognition engine.

The obtaining the first character string comprises recognizing the first character string and the first edition command with regard to the first user utterance received in a character input mode activated based on a previously defined event.

The performing the edition comprises identifying whether the second edition command is contained in the second user utterance received while the character input mode is being activated.

Further comprising: activating the character input mode based on a first event; and terminating the activation of the character input mode based on a second event.

According to another embodiment of the disclosure, there is provided a recording medium stored with a computer program comprising a code for performing a control method of an electronic apparatus as a computer readable code, the control method comprising: obtaining a first character string comprising a previously defined character from first user utterance; recognizing a second character string, which is edited from the first character string based on a first edition command, as an input character, based on the first user utterance comprising the first edition command following the first character string; and performing edition with regard to the second character string based on second edition command, based on second user utterance comprising the second edition command without the first edition command.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Figure 1:
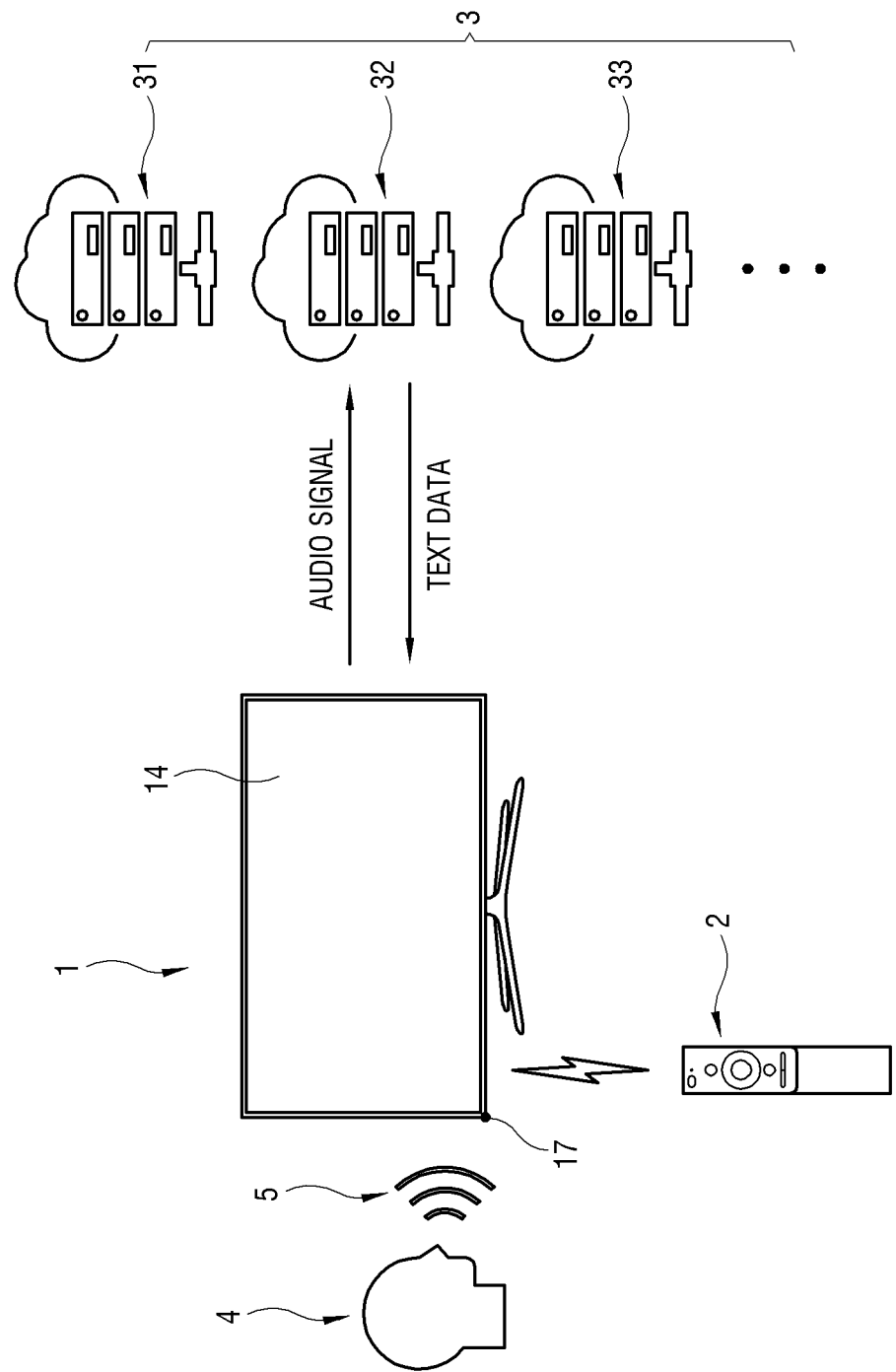
FIG. 1 illustrates an electronic apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates an electronic apparatus according to an embodiment of the disclosure. As shown in FIG. 1, the electronic apparatus 1 may include not only an image displaying apparatus such as a television (TV), a tablet computer, a portable media player, a wearable device, a video wall, an electronic frame, etc., but also various kinds of apparatuses without a display, for example, an image processing apparatus such as a set-top box, etc.; a home appliance such as a refrigerator, a washing machine, etc.; and an information processing apparatus such as a computer, etc. Further, the electronic apparatus 1 may be embodied by an artificial intelligence (AI) loudspeaker, an AI robot, or the like having an AI function. The kinds of electronic apparatus 1 are not limited to these examples, but it will be assumed for convenience of description that the electronic apparatus 1 is embodied by the TV.

The electronic apparatus 1 may include a microphone 17. The electronic apparatus 1 may receive a voice signal of user utterance 5 uttered by a user 4 through the microphone 17. The microphone 17 may be provided in a main body of the electronic apparatus 1, but not limited thereto. Alternatively, the microphone may be provided in a remote controller 2, a smartphone, etc. separated from the main body, etc. In this case, the electronic apparatus 1 may receive a voice signal received in the microphone 17 of the remote controller, the smartphone, etc.

The electronic apparatus 1 may perform a voice recognition function. When receiving the user utterance 5 from the user 4, the electronic apparatus 1 may obtain a voice signal from the user utterance 5, apply a voice recognition process to the obtained voice signal and perform an operation corresponding to a recognition result based on the voice recognition process. The voice recognition process includes a speech-to-text (STT) process for converting a voice signal into text data, and a command identifying and following process for identifying a command based on the text data and performing an operation specified by the identified command. For example, when the user utterance 5 is "volume up", the electronic apparatus 1 obtains text data based on the voice signal of the user utterance 5, identifies the command specified by the obtained text data, and turns up the volume of the electronic apparatus 1 based on the identified command.

Both the STT process and the command identifying and following process of the voice recognition process may be fulfilled in the electronic apparatus 1. However, this case makes the electronic apparatus 1 be subjected to relatively high system load and relatively high storage capacity. Therefore, at least a part of the process may be performed by at least one server 3 connecting and communicating with the electronic apparatus 1 through a network. For example, the at least one server 3 may perform the STT process, and the electronic apparatus 1 may perform the command identifying and following process.

Alternatively, the at least one server 3 may perform both the STT process and the command identifying and following process, and the electronic apparatus 1 may receive only results from the at least one server 3. For example, the electronic apparatus 1 may receive text data converted by a first server 31, which performs the STT process, of the at least one server 3, transmit the received text data to a second server 32 or a third server 33 which performs the command identifying and following process, and receive results from the second server 32 or the third server 33. However, for convenience of description, the description will be made on the assumption that the electronic apparatus 1 performs both the STT process and the command identifying and following process.

The electronic apparatus 1 may include at least one voice recognition model to perform the STT process. The voice recognition model refers to a hardware/software component used in a voice recognition process for a voice signal based on the user utterance 5. The voice recognition model may include a voice recognition program, a voice recognition engine, etc., and the voice recognition program may be given in the form of an application. The voice recognition model may for example include a hidden Markov Model (HMM), an acoustic model achieved by applying statistical modeling based on dynamic time warping (DTW) or the like algorithm to an uttered voice, a language model achieved by collecting a corpus (i.e. a collection of texts given in the forms to be handled, processed and analyzed by a computer for language research), etc. However, the voice recognition model is not limited to this example, but may include a language model in which N words after the current word are used in analyzing utterance intention like concept of a bigram and a trigram.

The electronic apparatus 1 may receive a character through the voice recognition function. For example, when a password input screen is displayed to receive a password for logging on to a specific service and the user 4 utters the password in units of individual letters, the electronic apparatus 1 recognizes the password uttered in units of individual letters and makes the recognized password be input to the password input screen.

The electronic apparatus 1 may edit a character previously input through the voice recognition function. When a wrong password is input to the password input screen and the user 4 utters a sound for editing the previously input password, the electronic apparatus 1 may edit the previously input password based on the utterance for the edition.

Figure 2:
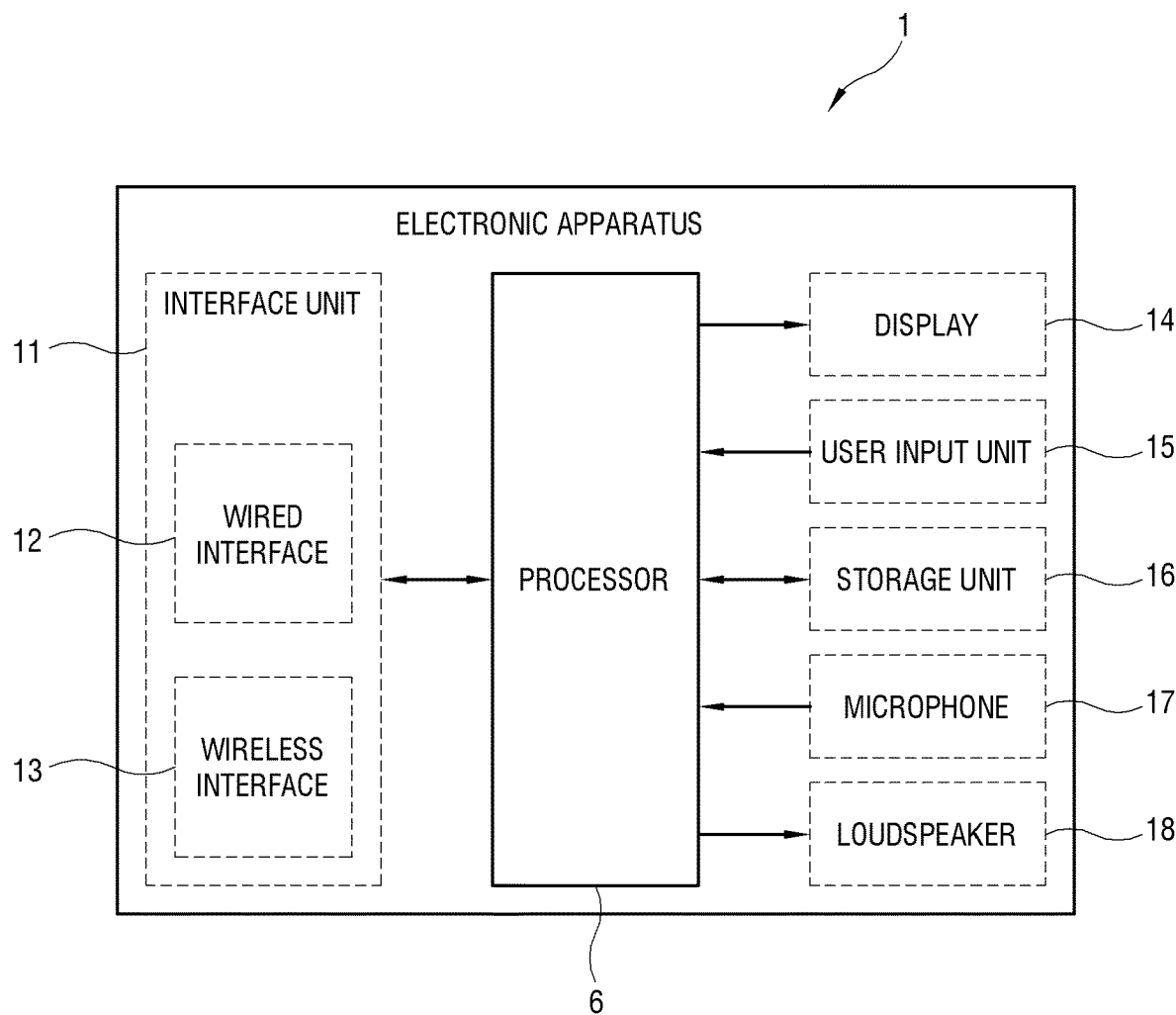
FIG. 2 shows an example of a configuration of the electronic apparatus of FIG. 1.

FIG. 2 illustrates a configuration of the electronic apparatus of FIG. 1. As shown in FIG. 2, the configuration of the electronic apparatus 1 will be described below in detail with reference to FIG. 2. In this embodiment, it will be described that the electronic apparatus 1 is a TV. However, the electronic apparatus 1 may be embodied by various kinds of apparatuses, and therefore the electronic apparatus 1 is not limited to this embodiment. The electronic apparatus 1 may not be embodied by the TV or the like display apparatus, and the electronic apparatus 1 in this case may not include the display 14 and the like elements for displaying an image. For example, when the electronic apparatus 1 is embodied by a set-top box, the electronic apparatus 1 may output an image signal to an external TV through an interface 11.

The electronic apparatus 1 may include the interface 11. The interface 11 may include a wired interface 12. The wired interface 12 may include a connector or port to which an antenna for receiving a broadcast signal based on broadcasting standards for terrestrial/satellite broadcasting, etc. is connected or to which a cable for receiving a broadcast signal based on cable broadcasting standards is connected. Alternatively, the electronic apparatus 1 may include a built-in antenna to receive a broadcast signal. The wired interface 12 may include a high definition multimedia interface (HDMI) port, a DisplayPort, a DVI port, and the like connector or port based on video and/or audio transmission standards such as thunderbolt, composite video, component video, super video, Syndicat des Constructeurs d'Appareils Radiorécepteurs et Téléviseurs (SCART), etc. The wired interface 12 may include a connector or port, etc. based on universal data transmission standards such as a universal serial bus (USB) port. The wired interface 12 may include a connector or port, etc. to which an optical cable based on optical transmission standards is connected. The wired interface 12 may include a connector or port, etc. which connects with an external microphone or an external audio device including a microphone, and receives an audio signal from the audio device. The wired interface 12 may include a connector or port, etc. which connects with an audio device such as a headset, an earphone, an external loudspeaker, etc. and transmits or outputs an audio signal to the audio device. The wired interface 12 may include a connector or port based on Ethernet or the like network transmission standards. For example, the wired interface 12 may be embodied by a local area network (LAN) card or the like connected to a router or gateway by a wire.

The wired interface 12 is connected to a set-top box, an optical media player or the like external device, a loudspeaker, a server, etc. in a manner of 1:1 or 1:N (where, N is a natural number) through the foregoing connectors or ports by a wire, thereby receiving a video/audio signal from the connected external device or transmitting a video/audio signal to the connected external device. The wired interface 12 may include connectors or ports to transmit the video/audio signals individually.

Further, according to this embodiment, the wired interface 12 may be internally provided in the electronic apparatus 1, or may be detachably connected to the connector of the electronic apparatus 1 as provided in the form of a dongle or module.

The interface 11 may include a wireless interface 13. The wireless interface 13 may be variously embodied corresponding to the electronic apparatus 1. For example, the wireless interface 13 may use wireless communication methods such as radio frequency (RF), Zigbee, Bluetooth, Wi-Fi, ultra wideband (UWB), near field communication (NFC), etc. The wireless interface 13 may be embodied by a wireless communication module based on Wi-Fi, a wireless communication module for Bluetooth or the like one-to-one direct wireless communication. The wireless interface 13 performs wireless communication with a server on a network, thereby exchanging a data packet with at least one server 3. The wireless interface 13 may include an infrared (IR) transmitter and/or an IR receiver to transmit and/or receive an IR signal based on IR communication standards. The through the IR transmitter and/or the IR receiver, the wireless interface 13 may receive or input therein a remote control signal from the remote controller 2 or another external device, or transmit or output the remote control signal to the remote controller 2 or another external device. Alternatively, the electronic apparatus 1 may exchange the remote control signal with the remote controller 2 or other external devices through the wireless interface 13 of different standards such as Wi-Fi, Bluetooth, etc.

When the video/audio signal received through the interface 11 is a broadcast signal, the electronic apparatus 1 may further include a tuner to be tuned to a channel for the received broadcast signal.

The electronic apparatus 1 includes a display 14. The display 14 includes a display panel capable of displaying an image on a screen. The display panel is provided to have a light receiving structure such as a liquid crystal type, or a self-emissive structure such as an organic light emitting diode (OLED) type. The display 14 may include an additional element according to the structures of the display panel. For example, when the display panel is the liquid crystal type, the display 14 includes a liquid crystal display panel, a backlight unit configured to emit light, and a panel driving substrate configured to drive liquid crystal of the liquid crystal display panel. However, the display 14 may be omitted when the electronic apparatus 1 is embodied by the set-top box or the like.

The electronic apparatus 1 includes a user input unit 15. The user input unit 15 includes circuitry related to various input interfaces provided to be controlled by a user to make a user input. The user input unit 15 may be variously configured according to the kinds of electronic apparatus 1, and may for example include a mechanical or electronical button of the electronic apparatus 1, a touch pad, a touch screen installed in the display 14, etc.

The electronic apparatus 1 includes a storage unit 16. The storage unit 16 is configured to store digitalized data. The storage unit 16 includes a nonvolatile storage in which data is retained regardless of whether power is on or off, and a volatile memory into which data to be processed by the processor 2 is loaded and in which data is retained only when power is on. The storage includes a flash memory, a hard-disc drive (HDD), a solid-state drive (SSD), a read only memory (ROM), etc., and the memory includes a buffer, a random-access memory (RAM), etc. When voice assistance is embodied by an application or the like software, the storage unit 16 may include the voice assistance.

The electronic apparatus 1 includes the microphone 17. The microphone 17 collects noise, sound, etc. of external environments, such as the user utterance 5 of the user 4. The microphone 17 transmits a collected voice signal to the processor 6. The microphone 17 may be provided in the main body of the electronic apparatus 1 or in the remote controller 2, the smartphone, etc. separated from the main body of the electronic apparatus 1. For example, the audio signal collected through the microphone 17 provided in the remote controller 2, the smartphone, etc. may be digitalized and received in the interface 11.

Meanwhile, the smartphone or the like may be installed with a remote-control application. The smartphone or the like may function as the remote controller through the installed application, for example, control the electronic apparatus 1, perform the voice recognition process with regard to the voice signal received through the microphone 17 provided in the smartphone or the like, etc. Such a remote-control application may be installed in various external apparatuses such as an AI speaker, an AI robot, etc.

The electronic apparatus 1 includes a loudspeaker 18. The loudspeaker 18 may output various sounds based on an audio signal. The loudspeaker 18 may be embodied by at least one loudspeaker. The loudspeaker 18 may be provided in the electronic apparatus 1, or may be embodied by an external loudspeaker provided in the outside. In this case, the electronic apparatus 1 may transmit an audio signal to the external loudspeaker by a wire or wirelessly.

The electronic apparatus 1 includes the processor 6. The processor 6 includes one or more hardware processors embodied as a central processing unit (CPU), a chipset, a buffer, a circuit, etc. which are mounted onto a printed circuit board, and may be embodied as a system on chip (SoC). When the electronic apparatus 1 is embodied as a display apparatus, the processor 6 includes modules corresponding to various processes, such as a demultiplexer, a decoder, a scaler, an audio digital signal processor (DSP), an amplifier, etc. Here, some or all of such modules may be embodied as an SOC. For example, the demultiplexer, the decoder, the scaler and the like video processing modules may be embodied as a video processing SOC, and the audio DSP may be embodied as a chipset separately from the SOC.

In particular, the processor 6 obtains a first character string including a previously defined character from first user utterance received through the microphone 17, recognizes a second character string, which is edited from the first character string by a first edition command, as an input character when the first edition command following the first character string is involved in the first user utterance, and performs edition with regard to a second character string based on a second edition command when second user utterance excluding the first edition command includes the second edition command.

However, the configuration of the electronic apparatus 1 is not limited to that shown in FIG. 2, but may exclude some elements from the foregoing elements or may include other elements in addition to the foregoing elements. For example, the electronic apparatus 1 includes a sensor unit. The sensor unit may include at least one sensor for detecting the motion, position, etc. of the user 4. For example, the sensor unit includes a distance sensor to detect the motion, position, etc. of the user 4 with respect to the electronic apparatus 1. The distance sensor may for example radiate infrared rays, ultrasonic waves, etc., and measure the motion, position, etc. of the user 4 based on difference between time when the infrared rays, ultrasonic waves, etc. are radiated and time when the infrared rays, ultrasonic waves, etc. reflected from the user 4 or the like come back to the distance sensor. However, the sensor unit is not limited to this example, but may further include an image acquirer to capture or photograph a front side of the electronic apparatus 1, and detect the motion, position, etc. of the user 4 based on an image obtained through the image acquirer. The image acquirer may be embodied by at least one camera.

Meanwhile, the processor 6 of the electronic apparatus 1 may use at least one of a machine learning, neural network, or deep learning algorithm as a rule-base or artificial intelligence (AI) algorithm to perform at least one of data analysis, process or result information generation for the foregoing operations of obtaining the first character string including the previously defined character from the first user utterance, recognizing the second character string, which is edited from the first character string by the first edition command, as the input character when the first edition command following the first character string is involved in the first user utterance, and performing the edition with regard to a second character string based on the second edition command when the second user utterance excluding the first edition command includes the second edition command.

For example, the processor 6 may function as both a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit 16 or server storage unit 42 or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the foregoing operations. The target data may be obtained from the storage unit 16 or the server storage unit 42, or from the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

Figure 3:
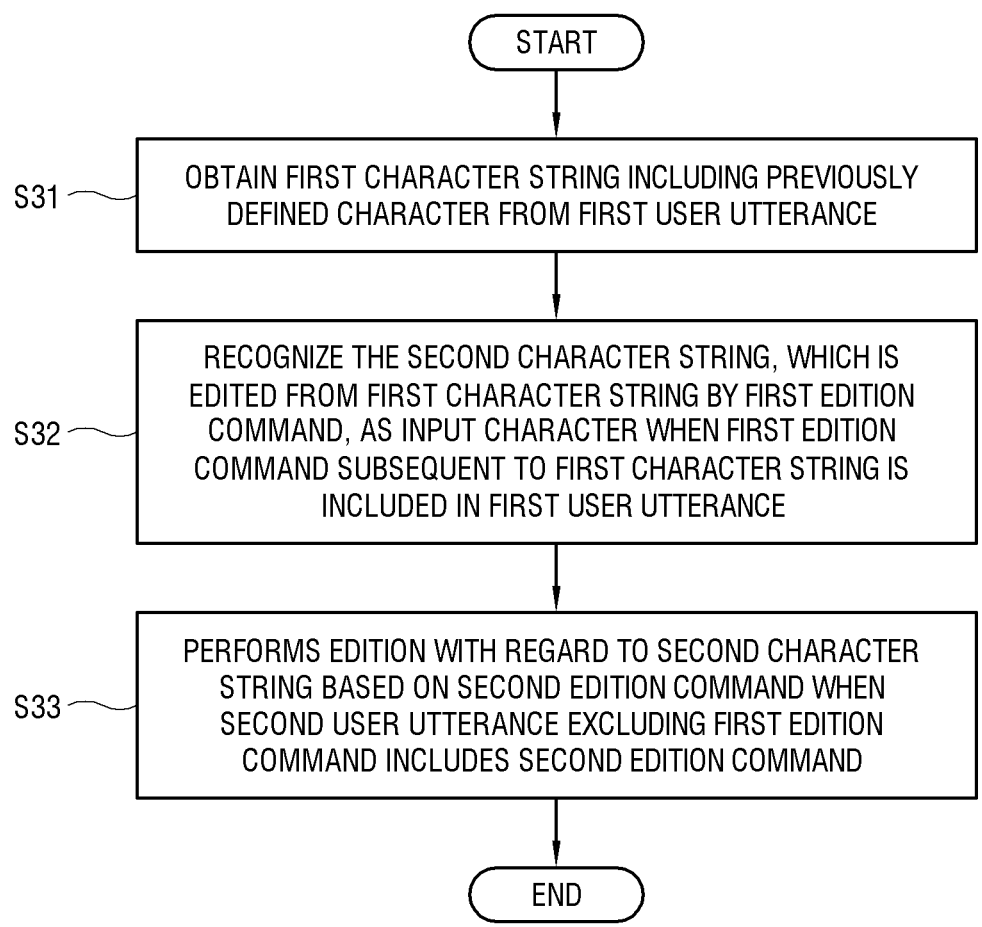
FIG. 3 shows an example of a control method of the electronic apparatus of FIG. 1.

FIG. 3 illustrates a control method of the electronic apparatus of FIG. 1. Operations of FIG. 3 may be carried out by the processor 6 of the electronic apparatus 1. As shown in FIG. 3, the processor 6 may obtain the first character string including the previously defined character from the first user utterance (S31). Here, the previously defined character may be given in units of individual letters, and include regional characters such as a Hangeul which is Korean alphabet, an alphabet, a hiragana which is a Japanese alphabet, etc.; digits such as '1', '2', '3', etc.; and symbols such as an exclamation mark, a question mark, etc. However, the previously defined character is not limited to these, but may include currencies, figures, emoticons, etc.

Further, when the first edition command subsequent to the first character string is included in the first user utterance, the processor 6 may recognize the second character string, which is edited from the first character string by the first edition command, as the input character (S32). Here, the first edition command may include "delete" or the like edition command. For example, "delete" may be the edition command issued to delete the character of the first character string. However, the kind of the first edition command is not limited to this example, but may be designed to include various edition commands.

Further, when the second user utterance excluding the first edition command includes the second edition command, the processor 6 performs edition with regard to the second character string based on the second edition command (S33). Here, the second edition command does not include the first edition command but may include an edition command recognizable as a whole or a part of the second user utterance. For example, when the second user utterance is "move the cursor left", the second user utterance does not include the first edition command but may include an edition command as a whole, which is issued to move the cursor 1 step left from a predetermined position in the previously obtained character string. In this case, the processor 6 may perform the edition based on the second edition command, for example, issued to make the position of the cursor displayed on the screen be moved 1 step left.

By the control method according to this embodiment, the processor 6 performs the edition based on whether or not the user utterance includes the first edition command and the second edition command, so that more various and extensive edition commands can be issued, thereby improving utilization of the edition function based on the voice recognition.

Figure 4:
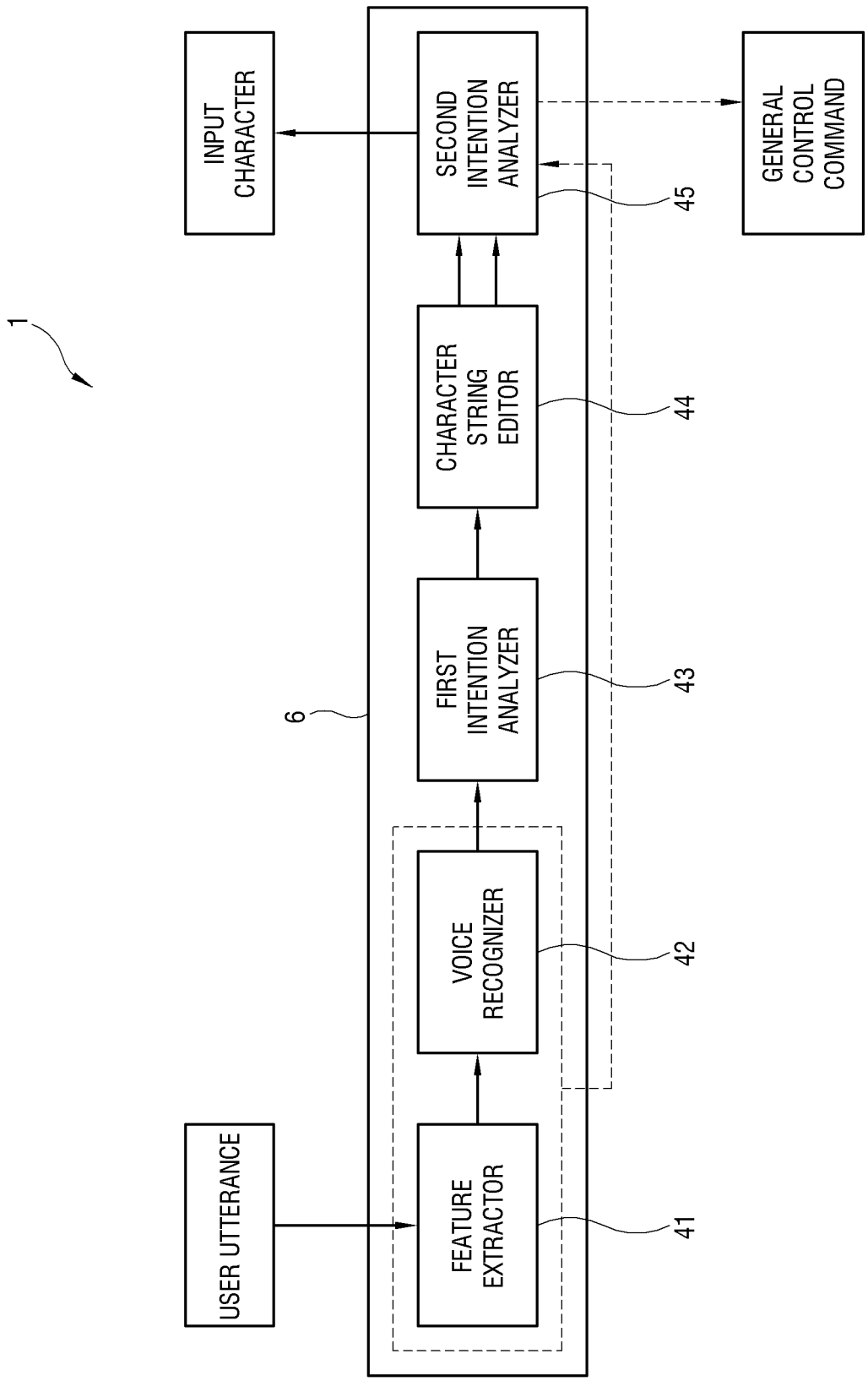
FIG. 4 illustrates a configuration of an electronic apparatus according to an embodiment of the disclosure.

FIG. 4 illustrates a configuration of an electronic apparatus according to an embodiment of the disclosure. As shown in FIG. 4, the electronic apparatus 1 may include the processor 6. Below, elements of the processor 6 according to this embodiment and operations of the elements will be described in detail.

The processor 6 may include a feature extractor 41. The feature extractor 41 may extract a feature vector from received user utterance. The feature extractor 41 may use various algorithms to extract the feature vector.

The processor 6 may include a voice recognizer 42. The voice recognizer 42 may recognize a character string from the feature vector of the user utterance extracted by the feature extractor 41, and generate or output the recognized character string. The voice recognizer 42 may recognize the previously defined character included in the character string in units of spacing words. The voice recognizer 42 may output recognition results including spacing in relation to the previously defined character, and output recognition results including spacing conforming to a word spacing rule with regard to a word. For example, the voice recognizer 42 may output a character string of "a b c" with regard to user utterance of "a b c".

The processor 6 may include a first intention analyzer 43. The first intention analyzer 43 may perform a first intention analysis, in other words, may analyze intention of the user 4 with regard to the character string recognized by the voice recognizer 42. To analyze the intention of the user 4 in real time with regard to the character string, which is given in units of spacing words, output in the middle of the user utterance, the first intention analyzer 43 may for example recognize the first edition command such as "delete", "delete all", "cancel", etc. "Delete" refers to an edition command intended to delete a character of the character string, and "delete all" refers to an edition command intended to delete all the character string. Further, "cancel" refers to an edition command intended to cancel an input to the previously input character.

The first intention analyzer 43 may analyze intention for the character string in real time, by recognizing the first edition command of which the kinds or numbers and levels are restricted as described above. Meanwhile, the first edition command is contrasted with the second edition command to be recognized by a second intention analyzer 45 to be described later, in which the second edition command is recognized as a whole or a part of the character string and thus different from the first edition command in being recognized with more kinds or numbers and more extensive levels.

To analyze the intention of the user 4, the first intention analyzer 43 may ignore the character strings except the previously defined character and the first edition command in the user utterance. For example, when the user utterance is "a b c delete please", the first intention analyzer 43 ignores the character string of "please" even though "please delete a b c" contains a predetermined character string of "please" in addition to the character string of "a b c" including previously defined characters and the first edition command of "delete", thereby analyzing the intention of the user 4 for deleting "c" from the character string of "a b c" based on the user utterance.

The processor 6 may include a character string editor 44. The character string editor 44 may edit the character string based on the first intention analysis of the first intention analyzer 43, in other words, intention of a user 4 analyzed by the first intention analyzer 43. Below, it will be described in detail that the character string editor 44 edits the character string based on the first intention analysis, for example, when the user utterance is "1 2 3 delete 4 5 delete all 7 8." Based on the user utterance of "1 2 3 delete", "123" is displayed on the character input screen, but "delete" deletes "3" from "1 2 3" displayed on the character input screen, thereby causing only "1 2" to be displayed. Then, the user utterance of "4 5" causes "1 2 4 5" to be displayed on the character input screen, and the following user utterance of "delete all" causes "1 2 4 5" displayed on the character input screen to be deleted. Therefore, any character is not displayed on the character input screen. In addition, the user utterance of "7 8" causes "7 8" to be newly displayed on the character input screen. In other words, the character string editor 44 can obtain the character string of "7 8" based on the intention of the user 4 contained in the user utterance of "1 2 3 delete 4 5 delete all 7 8."

Below, it will be described in detail that the second intention analyzer 45 performs the second intention analysis with regard to the user utterance, in other words, additionally analyzes the intention of the user 4, and performs the edition with regard to the previously obtained character string based on the analyzed intention. However, when the character string is edited based on the first edition command identified by the first intention analyzer 43, an additional intention analysis or edition of the second intention analyzer 45 may be designed not to be carried out.

The processor 6 may further include the second intention analyzer 45. The second intention analyzer 45 may recognize the user utterance for controlling general functions of the electronic apparatus 1. For example, the second intention analyzer 45 may recognize whether a character string obtained from user utterance by the feature extractor 41 and the voice recognizer 42 contains a function control command such as volume control, channel switching, etc. in the TV, and make the electronic apparatus 1 operate based on the recognized function control command. In other words, the second intention analyzer 45 may control the function of the electronic apparatus 1 based on a recognized control command when the user utterance is recognized as a general function control command, and may perform the edition based on a recognized second edition command when the user utterance is recognized as containing the second edition command to be described later in detail.

After the user utterance is finished, the second intention analyzer 45 may apply the second intention analysis to each or all of the whole character string recognized by the voice recognizer 42 and the character string primarily edited by the character string editor 44 based on the first intention analysis. The second intention analysis refers to analysis of whether each character string contains the second edition command. For example, when the user utterance is "move the cursor 3 steps left", the second intention analyzer 45 may identify that the character string of "move the cursor 3 steps left" recognized by the voice recognizer 42 contains the second edition command issued to move the cursor displayed on the character input screen 3 steps left, and make the position of the cursor displayed on the character input screen be moved 3 steps left based on the identified second edition command.

According to the foregoing first intention analysis, the character strings except the previously defined character and the first edition command are ignored in the character string of "move the cursor 3 steps left" recognized by the voice recognizer 42, and therefore the character string primarily edited based on the first intention analysis may be "3". On the other hand, the second intention analyzer 45 may identify that the second edition command is not included in the character string of "3" as a result of applying the second intention analysis to the character string of "3", thereby performing the edition based on the second edition command identified as included in the whole character string of "move the cursor 3 steps left" while ignoring the result of the second intention analysis to the character string of "3". However, the edition is not limited to that performed by the second intention analyzer 45. As necessary, the edition may be performed by the character string editor 44 based on the second edition command identified by the second intention analyzer 45.

On the other hand, when it is identified as the result of the second intention analysis that the second edition command is not included throughout the whole character string, the second intention analyzer 45 may recognize the primarily edited character string as the input character. Referring to the foregoing example, when the character string recognized by the voice recognizer 42 is "1 2 3 delete 4 5 delete all 7 8" but the character string edited by the character string editor 44 is "7 8", the second intention analyzer 45 may identify that the second edition command is not included in the character string of "1 2 3 delete 4 5 delete all 7 8" and identify the primarily edited character string of "7 8" as the input character.

Like this, the processor 6 according to an embodiment fulfils the character input more appropriate to suite the utterance intention of the user 4 by applying the first intention analysis and the second intention analysis to the user utterance, thereby improving reliability of the character input based on the voice recognition.

Figure 5:
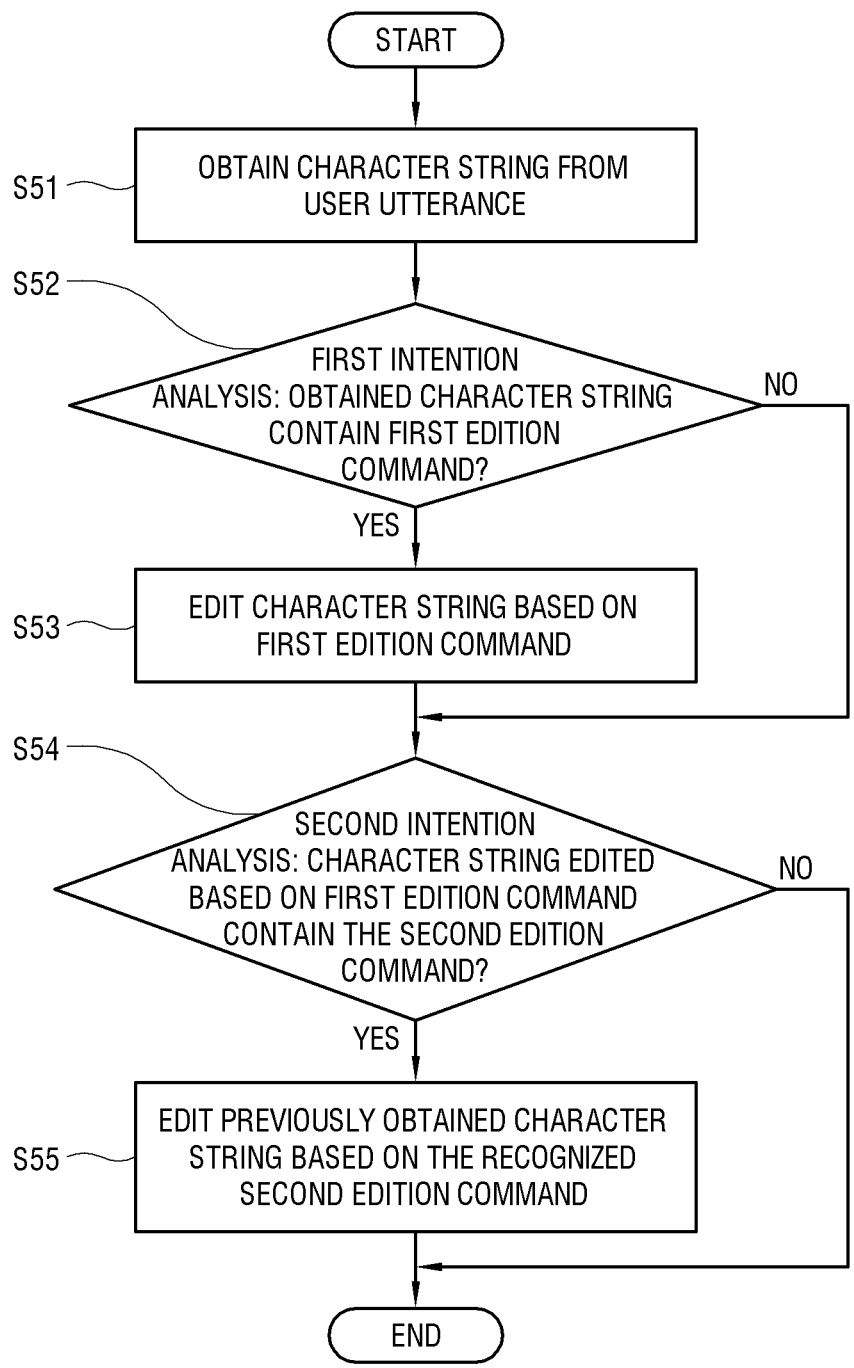
FIG. 5 shows another example of the control method of the electronic apparatus shown in FIGS. 3 and 4.

FIG. 5 shows another example of the control method of the electronic apparatus shown in FIGS. 3 and 4. Operations shown in FIG. 5 are given to more specify the operations of FIG. 3, and the following detailed descriptions will be made focusing on parts not described with reference to FIG. 3. As shown in FIG. 5, the processor 6 may obtain a character string from user utterance (S51).

Further, the processor 6 may perform the first intention analysis, in other words, identify whether the obtained character string contains the first edition command (S52).

When the obtained character string includes the first edition command, the processor 6 may edit the character string based on the first edition command (S53).

Further, the processor 6 may perform the second intention analysis, in other words, identify whether the character string edited based on the first edition command includes the second edition command (S54). When it is identified in the operation S53 that the first edition command is not included in the obtained character string, the processor 6 may apply the second intention analysis to the obtained character string, in other words, identify whether the second edition command is included in the obtained character string.

When it is identified that the edited character string or obtained character string contains the second edition command, the processor 6 may edit the character string based on the identified second edition command (S55).

Thus, by the control method according to an embodiment, the processor 6 applies two-step intention analyses to the user utterance, and thus fulfils the character input more appropriate to suite the utterance intention of the user 4, thereby improving reliability of the character input based on the voice recognition.

Figure 6:
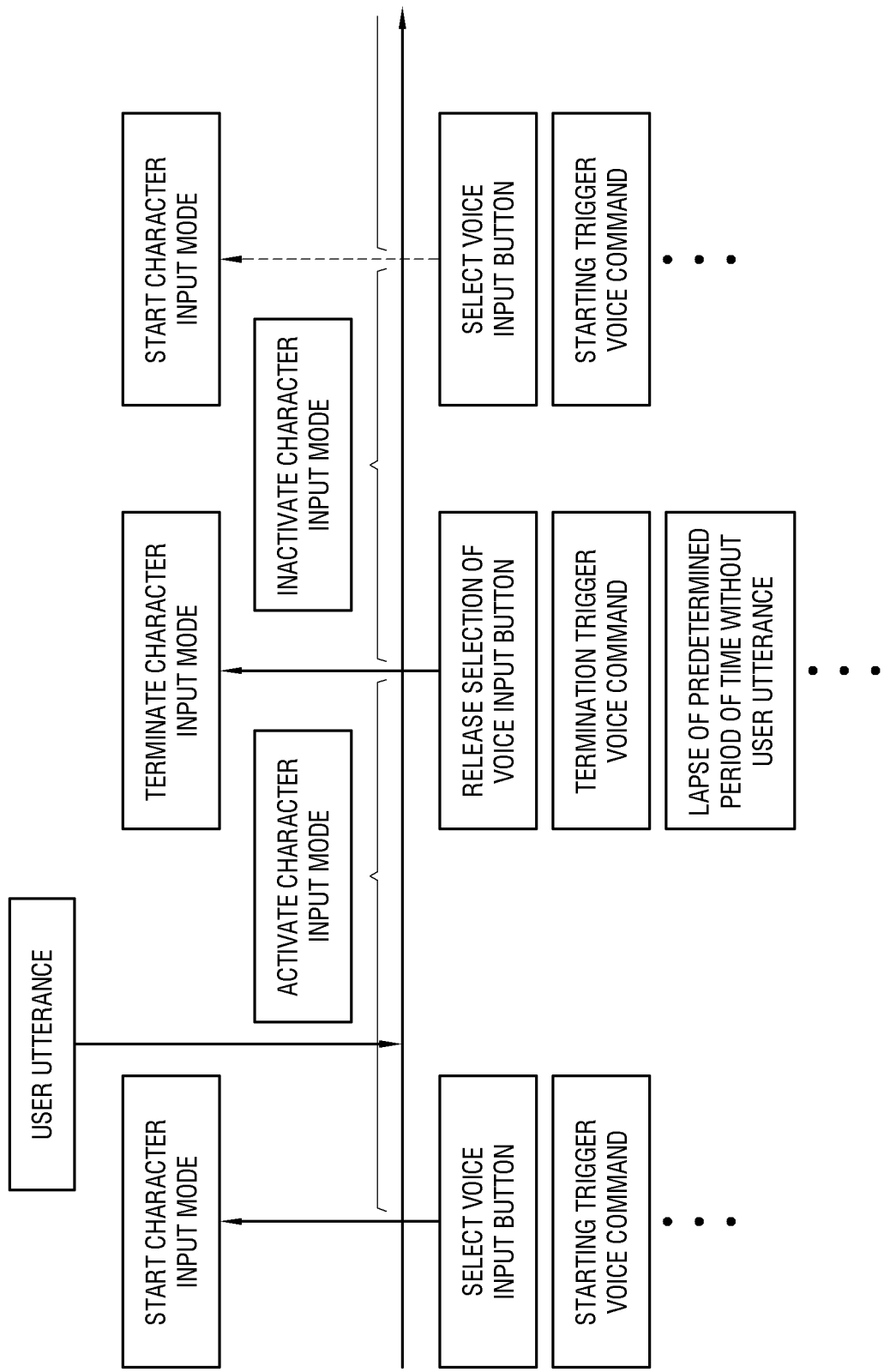
FIG. 6 shows an example of a user input for activating a character input mode in connection with an operation S51 in FIG. 5.

FIG. 6 shows an example of a user input for activating a character input mode in connection with the operation S51 in FIG. 5. As shown in FIG. 6, the processor 6 may activate a character input mode to receive user utterance for a character input.

The processor 6 may activate the character input mode by a previously defined event for starting the character input mode. The previously defined event for starting the character input mode may include a user input for starting the character input mode, for example, selection of a voice input button, reception of a starting trigger, etc. The starting trigger may include "character input start" or the like preset voice command which means the activation of the character input mode. The voice input button may be provided in the main body of the electronic apparatus 1, but not limited thereto. Alternatively, the voice input button may be provided in the remote controller 2, the smartphone, etc. Further, the microphone 17 for receiving the starting trigger may be provided in not only the main body of the electronic apparatus 1 but also the remote controller 2, the smartphone, etc. In this case, the processor 6 may receive a voice signal corresponding to the starting trigger from the remote controller 2, the smartphone, etc. However, the previously defined event for starting the character input mode is not limited to the foregoing description, but may be variously designed.

Further, the processor 6 may terminate the activation of the character input mode based on an event previously defined for terminating the character input mode, in other words, inactivate the character input mode. The event previously defined for terminating the character input mode may include selection release of the voice input button for starting the character input mode, reception of a termination trigger for terminating the character input mode, etc. The termination trigger may include "character input end" or the like preset voice command which means the inactivation of the character input mode. However, the previously defined event for terminating the character input mode is not limited to the foregoing description. Alternatively, the processor 6 may terminate the activation of the character input mode based on whether a predetermined period of time elapses. For example, when a predetermined period of time elapses after a user input for starting the character input mode, for example, selection of the voice input button, reception of the starting trigger, etc. or when a predetermined period of time elapses after receiving the first user utterance during the activation of the character input mode, the processor 6 may identify as the previously defined event for terminating the character input mode.

Thus, the processor 6 according to an embodiment can activate or inactivate the character input mode based on variously defined events, thereby improving convenience in the character input based on the voice recognition.

Figure 7:
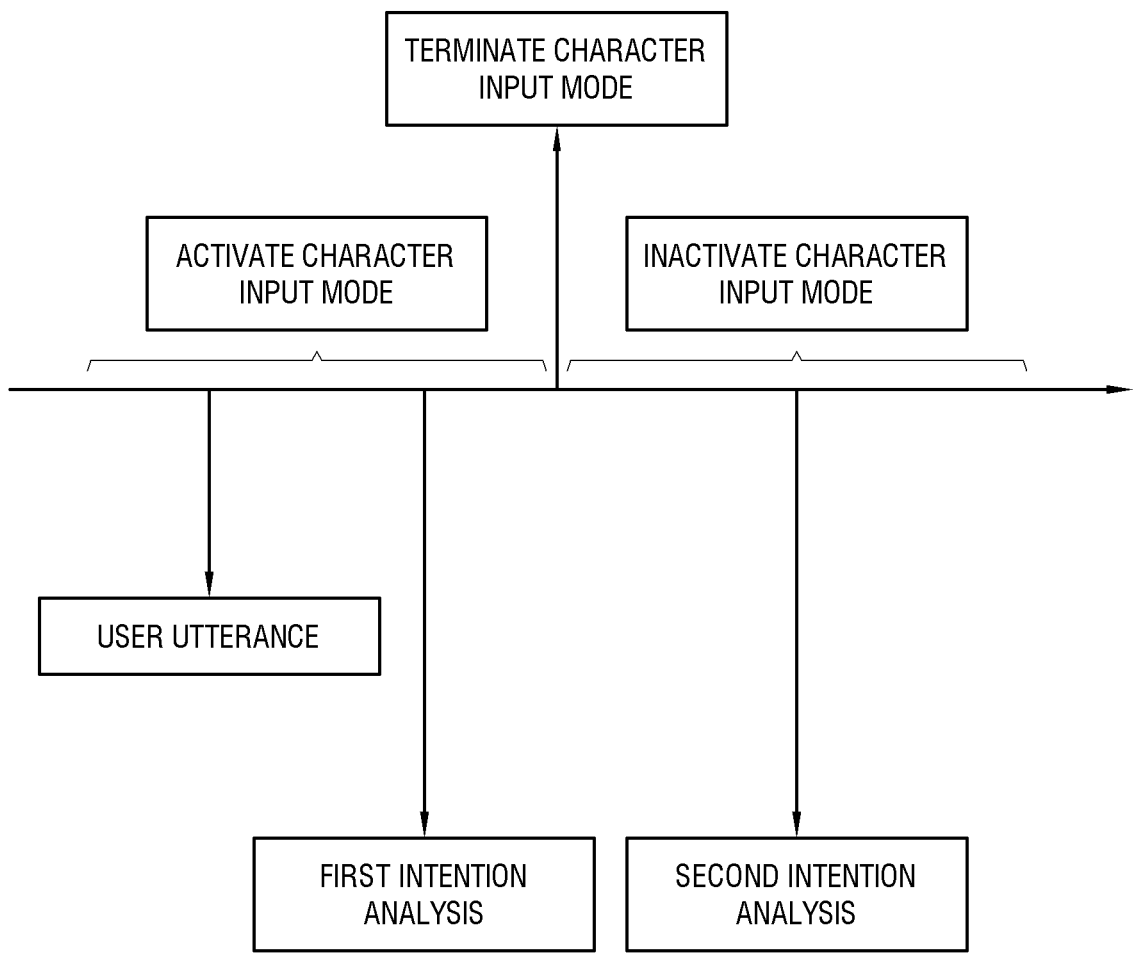
FIG. 7 shows an example of performing a first intention analysis during the activation of the character input mode in connection with an operation S52 in FIG. 5.

FIG. 7 shows an example of performing the first intention analysis during the activation of the character input mode in connection with the operation S52 in FIG. 5. As shown in FIG. 7, the processor 6 may receive the user utterance while the character input mode is being activated.

The processor 6 may perform the first intention analysis with regard to user utterance while the character input mode is being activated. In other words, the processor 6 may recognize the first edition command subsequent to the character string obtained from the user utterance during the activation of the first character input mode, and edit the character string based on the recognized first edition command.

When the activation of the character input mode is terminated with regard to the user utterance, the processor 6 may perform the second intention analysis. In other words, when the activation of the character input mode is terminated, the processor 6 may identify whether the second edition command is contained in the user utterance which does not include the first edition command, and edit the character string based on the identified second edition command.

Like this, the processor 6 according to an embodiment performs the second intention analysis after the activation of the character input mode is terminated with regard to the user utterance received during the activation of the character input mode, and thus fulfils the character input more appropriate to suite the utterance intention of the user 4, thereby improving reliability of the character input based on the voice recognition.

Figure 8:
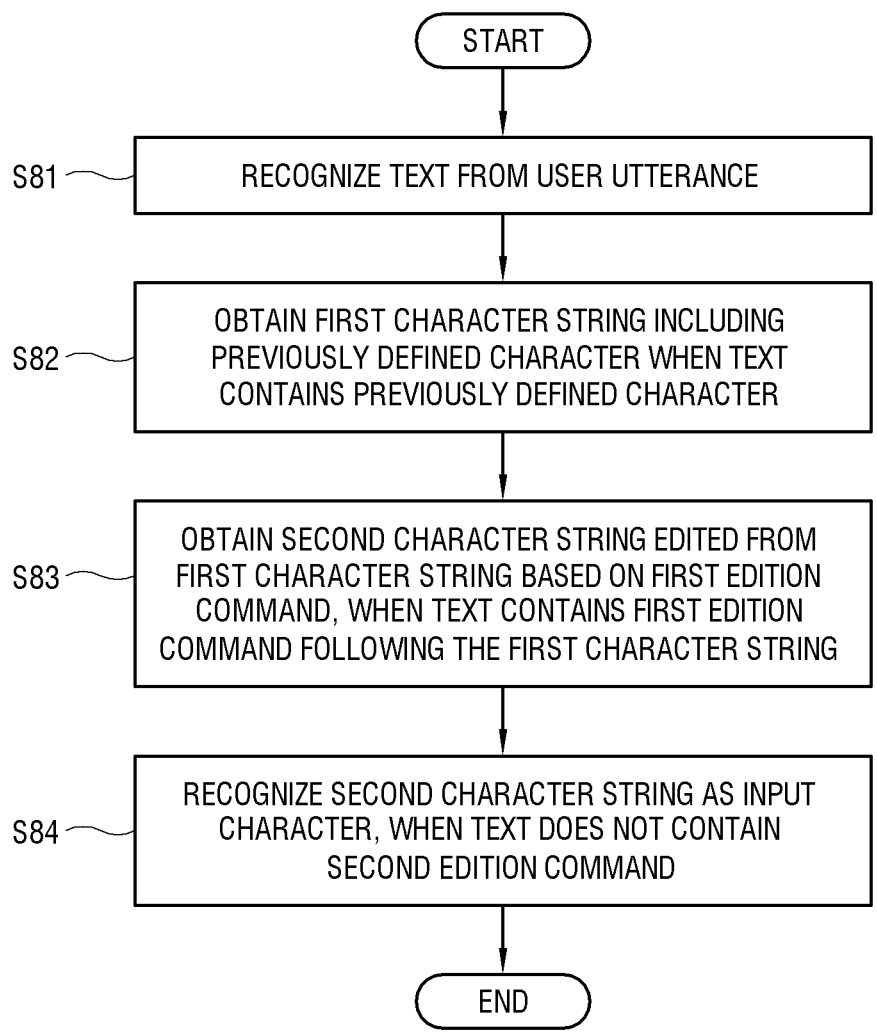
FIG. 8 shows an example of a control method of inputting a character in connection with operations S32 and S33 in FIG. 3.

FIG. 8 shows an example of a control method of inputting a character in connection with the operations S32 and S33 in FIG. 3. Below, a method of inputting a character based on the intention analysis according to an embodiment will be described in detail with reference to FIG. 8 together with FIG. 9.

Figure 9:
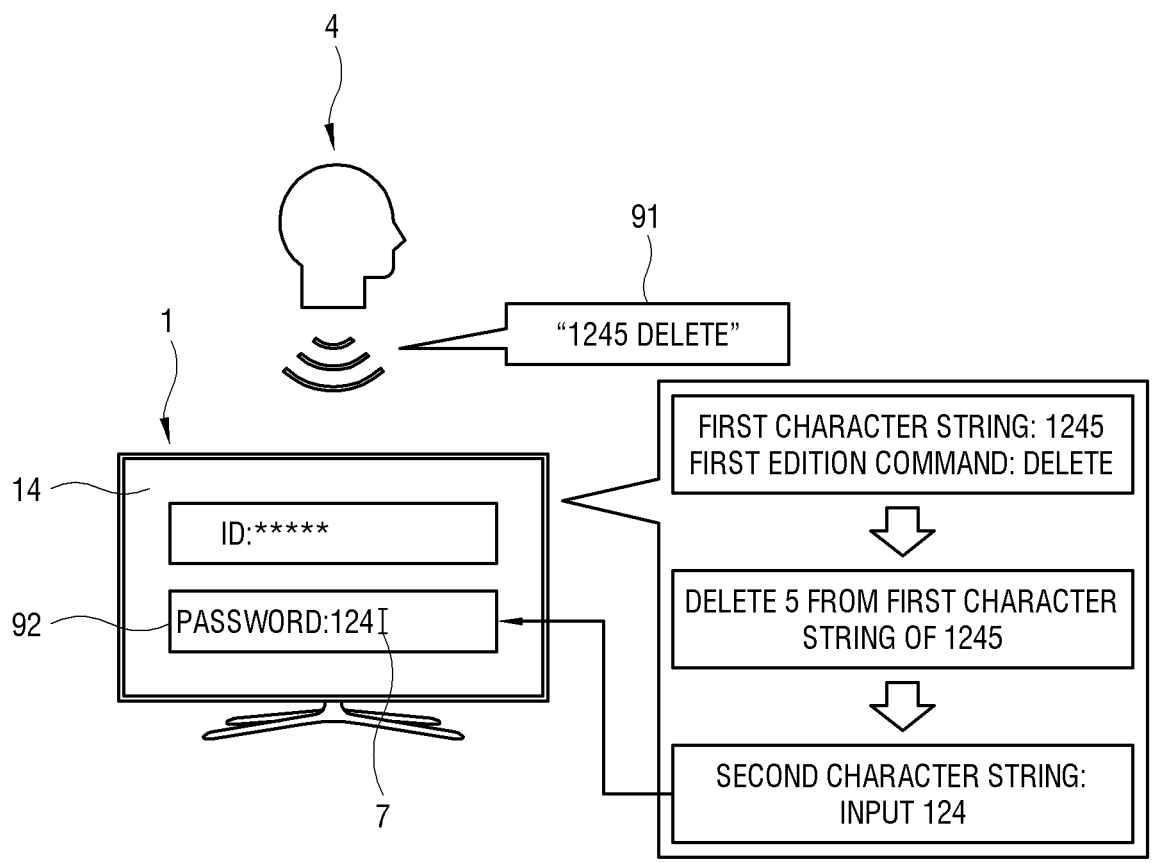
FIG. 9 shows an example of editing a character string based on the control method of FIG. 8.

The processor 6 may recognize a text from the user utterance (S81). For example, as shown in FIG. 9, it will be assumed that the character input screen, e.g. a password input screen 92 is displayed, and characters in a password are input based on user utterance. In this case, when user utterance 91 of "1245 delete" is received from the user 4, the processor 6 may recognize a text of "1245 delete" from the user utterance 91.

When the recognized text contains the previously defined character, the processor 6 may obtain the first character string in which the previously defined character is contained (S82). For example, the text of "1245 delete" contains the previously defined character of "1245", and therefore the processor 6 can obtain the first character string of "1245" including the previously defined character "1245".

Further, when the first edition command following the first character string is contained in the text, the processor 6 may obtain the second character string edited from the first character string based on the first edition command (S83). For example, the processor 6 may identify that the text of "1245 delete" contains the first edition command "delete" following the first character string of "1245", and thus obtain the second character string of "124" edited from the first character string of "1245" based on the first edition command of "delete".

Further, when the text does not include the second edition command, the processor 6 may recognize the second character string as the input character (S84). For example, the second edition command is not contained in the text of "1245 delete", and therefore the processor 6 recognizes the second character string of "124" as the input character, thereby for example displaying a password of "123" on the password input screen 92.

Figure 10:
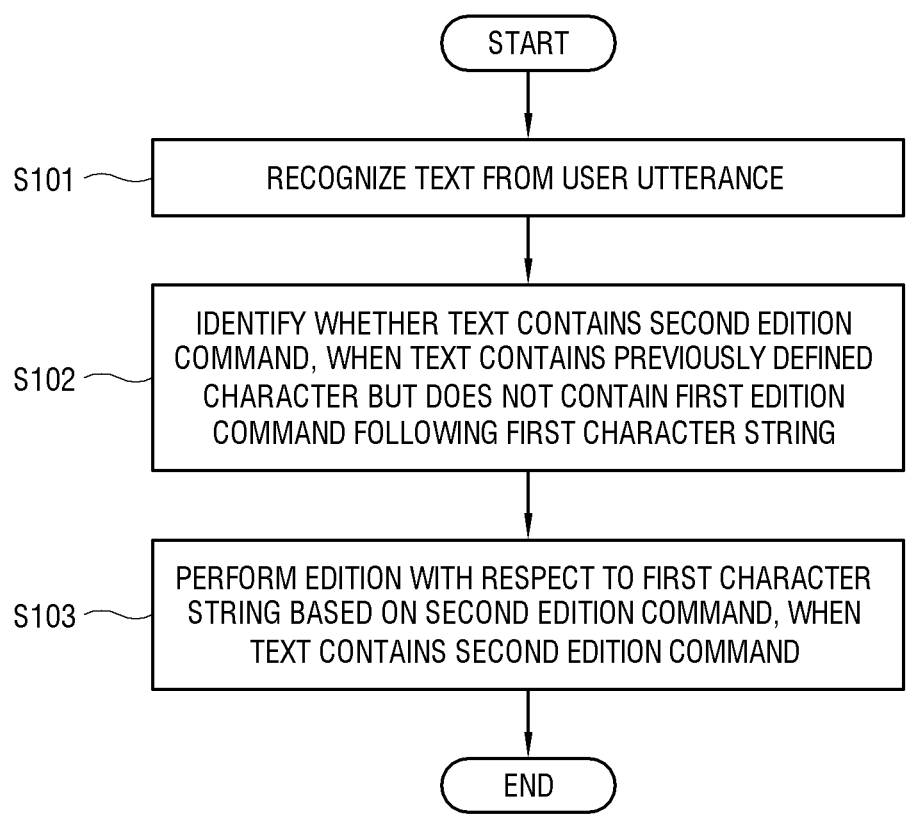
FIG. 10 shows an example of a control method of inputting a character in connection with the operations S32 and S33 in FIG. 3.

FIG. 10 shows an example of a control method of inputting a character in connection with the operations S32 and S33 in FIG. 3. Below, a method of inputting a character based on the intention analysis according to an embodiment will be described in detail with reference to FIG. 10 together with FIG. 11.

Figure 11:
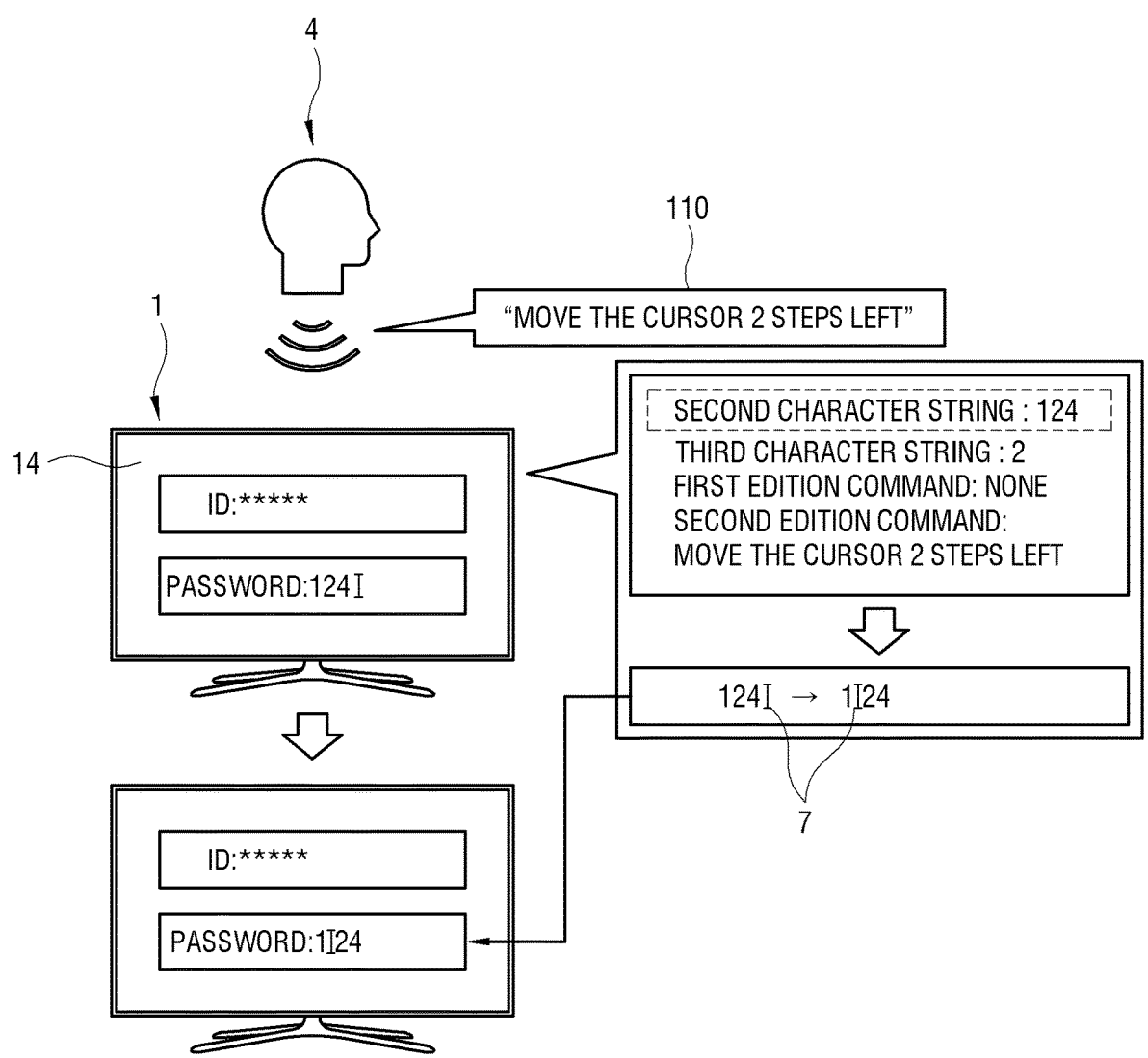
FIG. 11 shows an example of editing a character string based on the control method of FIG. 10.

The processor 6 may recognize a text from user utterance (S101). For example, as shown in FIG. 11, it will be assumed that user utterance 110 of "move the cursor 2 steps left" is received with regard to the second character string of "124" described with reference to FIG. 9. In this case, the processor 6 may obtain a text of "move the cursor 2 steps left" from the user utterance 110 of "move the cursor 2 steps left".

Further, when the text contains the previously defined character but does not contain the first edition command following the first character string including the previously defined character, the processor 6 may identify whether the text contains the second edition command (S102). For example, when the previously defined character of "2" is contained in the text of "move the cursor 2 steps left", the processor 6 may obtain a third character string of "2". However, when the first edition command subsequent to the third character string of "2" is not contained, the processor 6 may identify whether the second edition command is contained in the text of "move the cursor 2 steps left".

Further, when it is identified that the text contains the second edition command, the processor 6 may perform edition with respect to the first character string based on the identified second edition command (S103). For example, when it is identified that the text of "move the cursor 2 steps left" contains the second edition command, the processor 6 may perform the edition based on the second edition command, for example, move the cursor, which is positioned behind "4" in the second character string of "124" input as the password on the password input screen 92, 2 steps left to be positioned in between "1" and "2".

When the text does not contain the second edition command, the processor 6 may recognize the previously obtained third character string of "2" as the input character. In other words, when the text contains the second edition command even though it contains the previously defined character, the processor 6 may preferentially perform the edition based on the second edition command.

Figure 12:
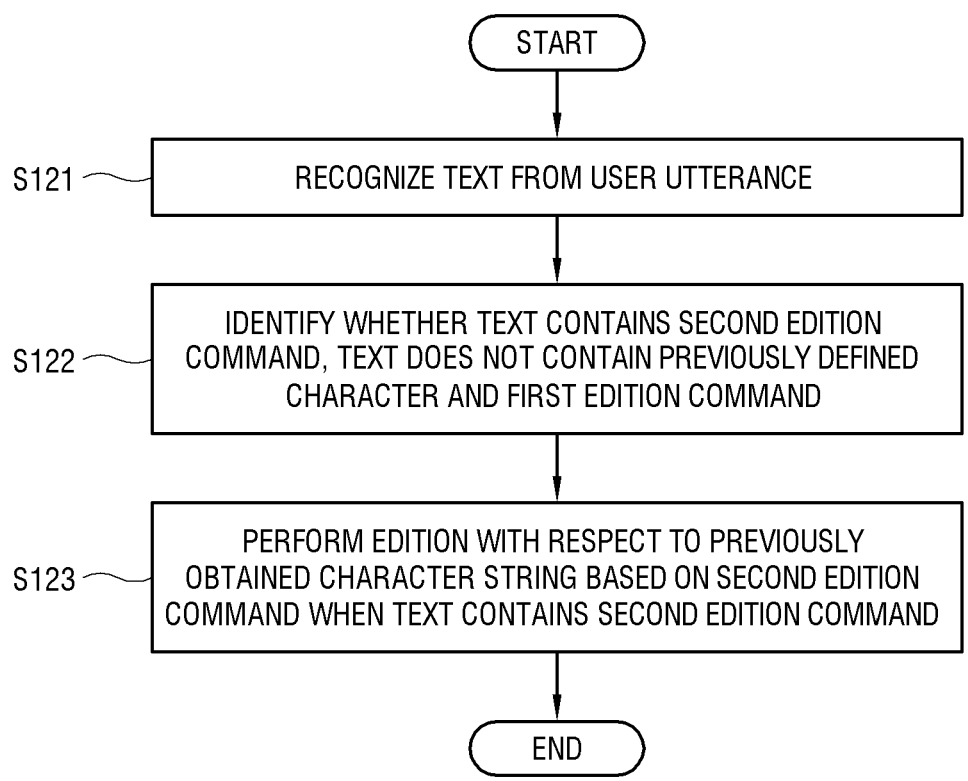
FIG. 12 shows an example of a control method of inputting a character in connection with the operations S32 and S33 in FIG. 3.

FIG. 12 shows an example of a control method of inputting a character in connection with the operations S32 and S33 in FIG. 3. Below, a method of inputting a character based on the intention analysis according to an embodiment will be described in detail with reference to FIG. 12 together with FIG. 13.

Figure 13:
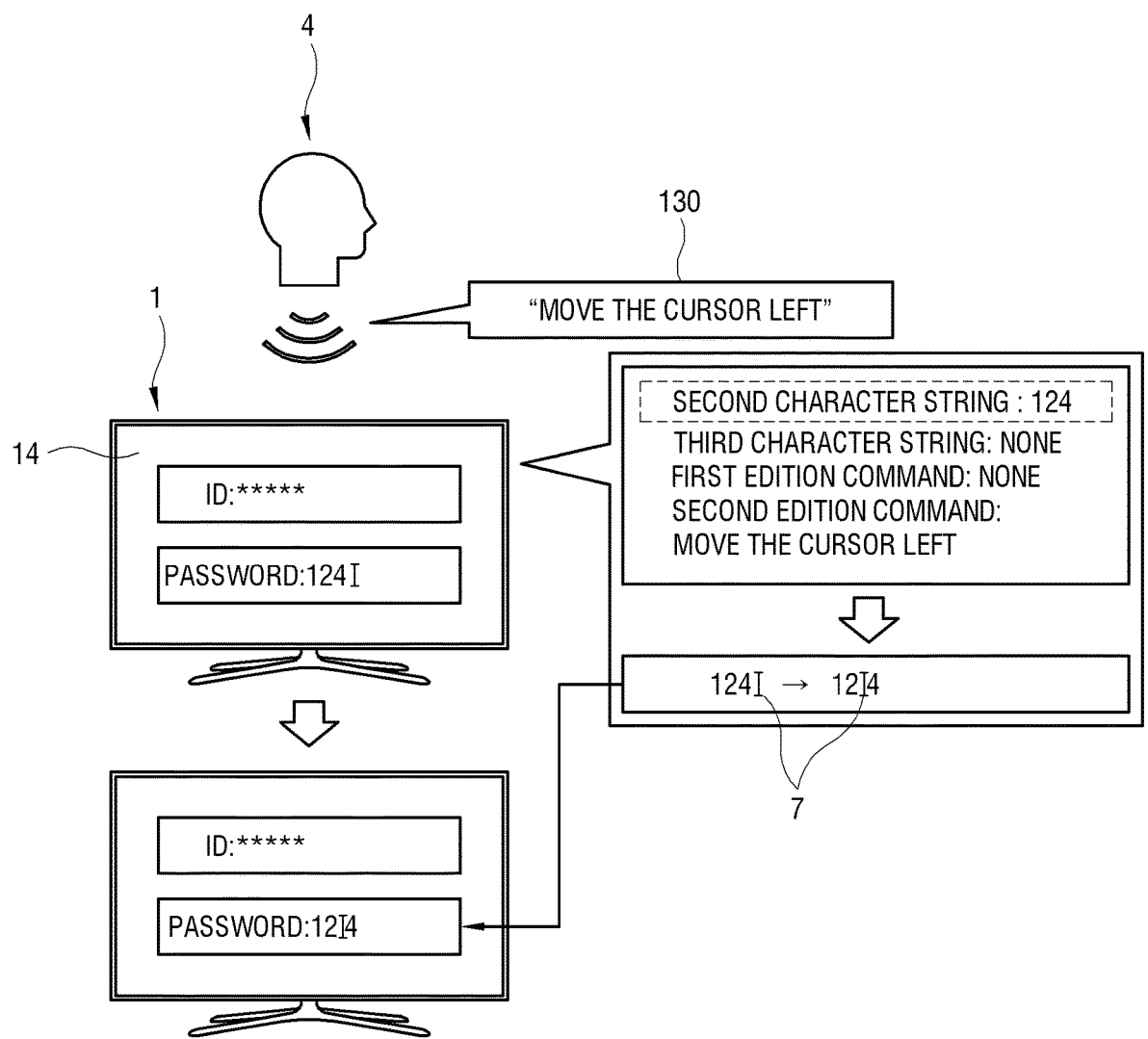
FIG. 13 shows an example of editing a character string based on the control method of FIG. 12.

The processor 6 may recognize a text from user utterance (S121). For example, as shown in FIG. 13, a text of "move the cursor left" may be obtained from user utterance 130 of "move the cursor left".

Further, when the text does not contain the previously defined character and the first edition command, the processor 6 may identify whether the text contains the second edition command (S122). For example, both the previously defined character and the first edition command are not contained in the text of "move the cursor left", and therefore the processor 6 may identify whether the text of "move the cursor left" contains the second edition command.

Further, when it is identified that the text contains the second edition command, the processor 6 may perform edition with respect to the previously obtained character string based on the identified second edition command (S123). For example, when it is identified that the text of "move the cursor left" contains the second edition command, the processor 6 may perform the edition based on the second edition command, for example, move the cursor, which is positioned behind "4" in the second character string of "124" input as the password on the password input screen 92, 1 step left to be positioned in between "2" and "4".

Figure 14:
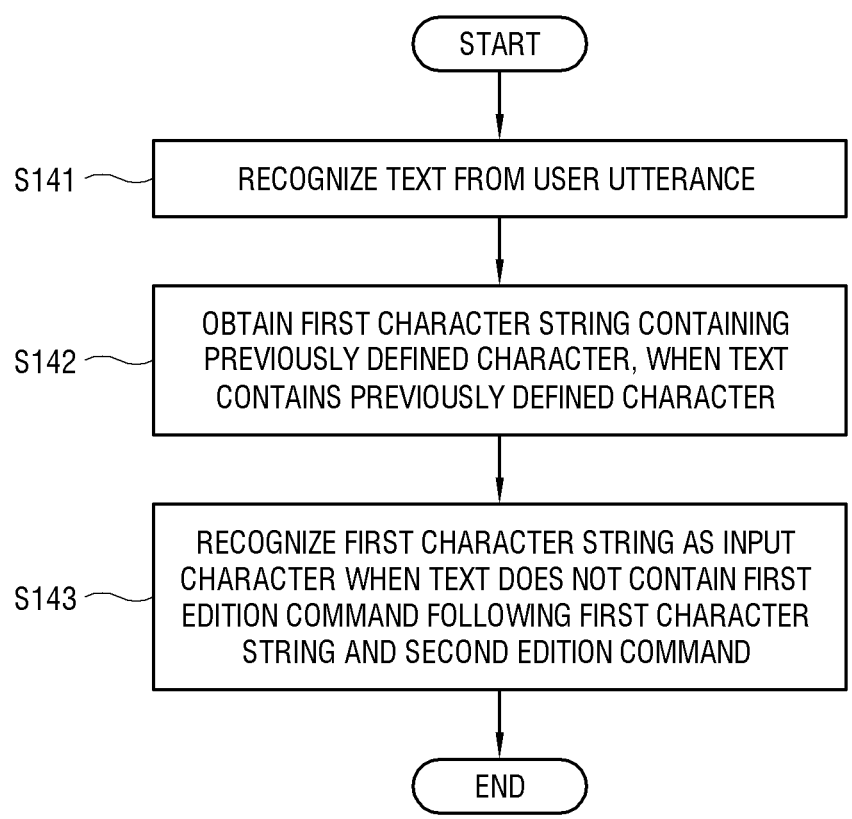
FIG. 14 shows an example of a control method of inputting a character in connection with the operations S32 and S33 in FIG. 3.

FIG. 14 shows an example of a control method of inputting a character in connection with the operations S32 and S33 in FIG. 3. Below, a method of inputting a character based on the intention analysis according to an embodiment will be described in detail with reference to FIG. 14 together with FIG. 15.

Figure 15:
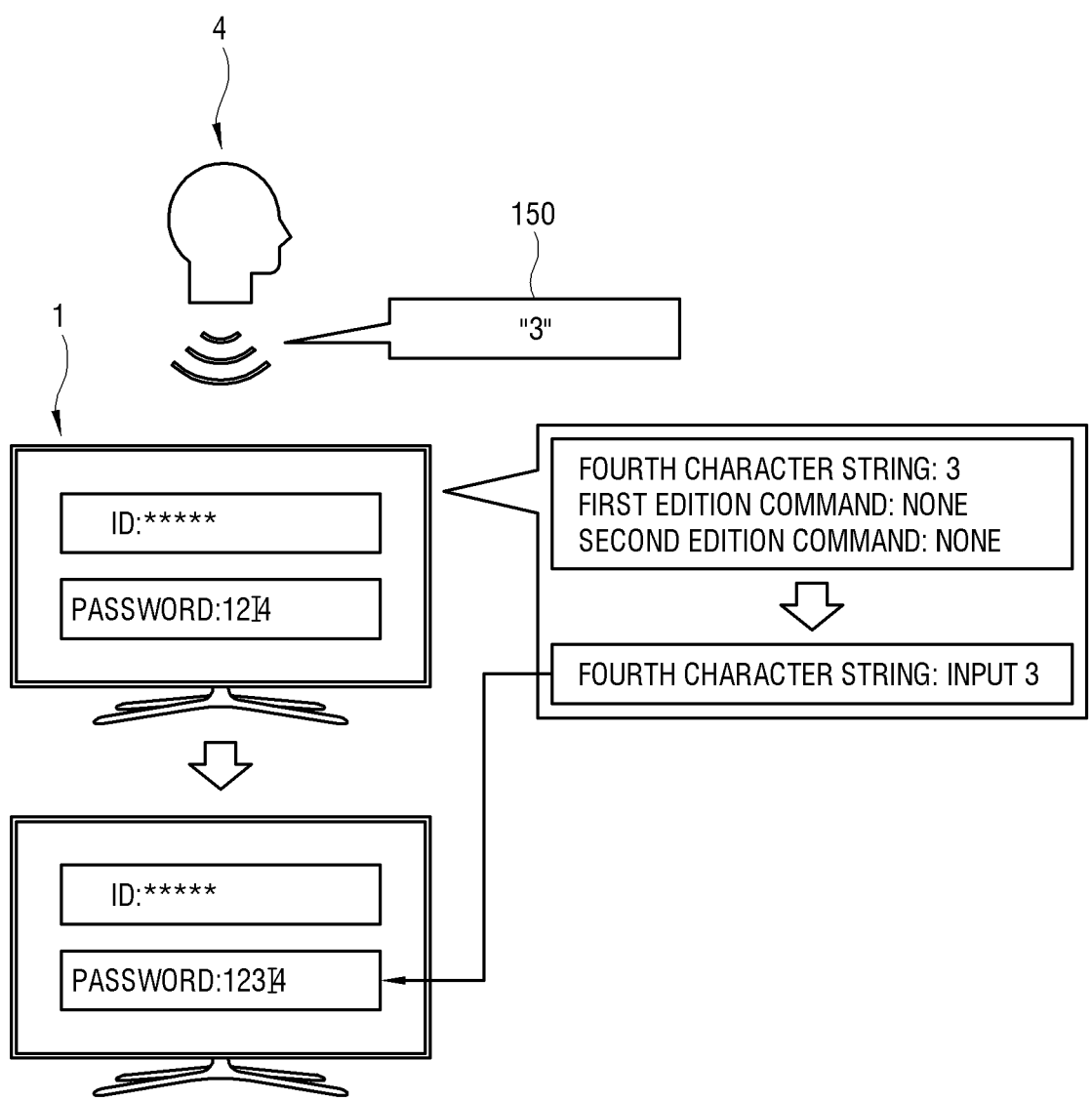
FIG. 15 shows an example of editing a character string based on the control method of FIG. 14.

The processor 6 may recognize a text from user utterance (S141). For example, as shown in FIG. 15, when user utterance 150 of "3" is received in the state that a cursor 7 is positioned between "2" and "4" in the second character string of "124", the processor 6 may recognize a text of "3" from the user utterance 150 of "3".

Further, when the text contains the previously defined character, the processor 6 may obtain the first character string containing the previously defined character (S142). For example, the processor 6 may obtain a fourth character string of "3" containing the previously defined character "3" from the text of "3".

Further, when the text does not contain the first edition command following the first character string and also does not contain the second edition command, the processor 6 may recognize the first character string as the input character (S143). For example, the processor 6 may recognize the fourth character string of "3" as the input character because the text of "3" does not contain the first edition command subsequent to the fourth character string of "3" and the text of "3" does not contain the second edition command. The processor 6 may for example display "3" in between "2" and "4" of the second character string of "124" displayed on the password input screen.

Figure 16:
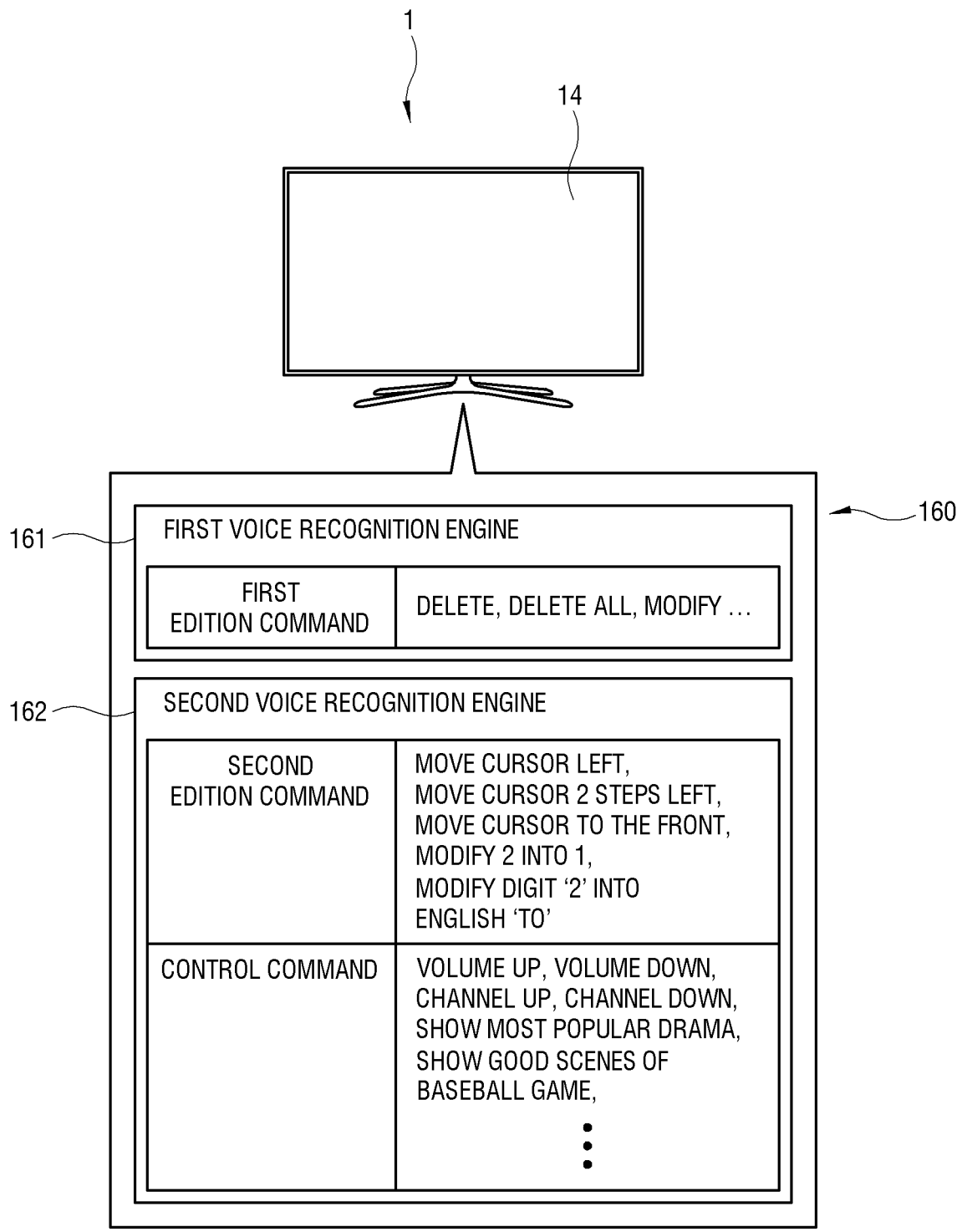
FIG. 16 shows an example of a first voice recognition engine and a second voice recognition engine in connection with the operations S32 and S33 in FIG. 3.

FIG. 16 shows an example of a first voice recognition engine and a second voice recognition engine used by the processor of FIG. 4. As shown in FIG. 16, the processor 6 may perform voice recognition based on a voice recognition engine 160. The voice recognition engine 160 may include a first voice recognition engine 161 for the first intention analysis, and a second voice recognition engine 162 for a second intention analysis.

In other words, when user utterance is received to input a character based on voice recognition, the processor 6 may perform the first intention analysis with regard to the user utterance based on the first voice recognition engine 161. For example, the processor 6 may recognize the first edition command, e.g. "delete", "delete all", etc. contained in the user utterance based on the first voice recognition engine 161.

Further, the processor 6 may recognize that the user utterance contains the second edition command based on the second voice recognition engine 162. Here, the kind or number of edition commands recognizable as including the second edition command based on the second voice recognition engine 162 may be more than the kind or number of edition commands recognizable as including the first edition command based on the first voice recognition engine 161. Further, an edition level of the second edition command may be higher in quality than the edition level of the first edition command based on the first voice recognition engine 161.

Meanwhile, the processor 6 may recognize the user utterance for controlling general functions of the electronic apparatus 1 based on the second voice recognition engine 162. For example, the processor 6 may recognize user utterance for requesting specific content, e.g. a popular drama, a good scene of a baseball game, etc. as well as the user utterance for volume control, channel switching, etc. of the TV based on the second voice recognition engine 162.

In other words, the processor 6 may perform the edition based on an identified second edition command when the second voice recognition engine 162 identifies that the user utterance contains the second edition command, and also control the functions of the electronic apparatus 1 based on a recognized control command when the user utterance is recognized as a general function control command.

Thus, the processor 6 according to an embodiment may use a single voice recognition engine to perform the edition for the character string or control general functions, thereby efficiently managing resources for the voice recognition.

Various embodiments of the disclosure may be achieved by software including one or more commands stored in a storage medium readable by the electronic apparatus 1 and the like. For example, the processor 6 of the electronic apparatus 1 may call and execute at least one command among one or more stored commands from the storage medium. This enables the electronic apparatus 1 and the like apparatus to operate and perform at least one function based on the at least one called command. The one or more commands may include a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium. For example, the 'non-transitory' storage medium may include a buffer in which data is temporarily stored.

For example, methods according to various embodiments of the disclosure may be provided as involved in a computer program product. The computer program product according to the disclosure may include instructions of software to be executed by the processor as mentioned above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product (e.g. a downloadable app) may be transitorily stored or temporarily produced in a machine-readable storage medium such as a memory of a manufacturer server, an application-store server, or a relay server.

According to the disclosure, there are provided an electronic apparatus and a control method thereof, in which more various and extensive edition commands can be issued for a wrong character input during a character input using a voice recognition function, thereby improving utilization of an edition function based on voice recognition.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
a display;
a memory; and
a processor, coupled to the memory, and configured to:
  obtain a first character string including a previously defined character and one or more words from a first voice input of a user, and
  identify whether the one or more words are a first edition command of a plurality of first edition commands, in advance, among the plurality of first edition commands and a plurality of second edition commands which are different from the plurality of first edition commands,
  based on the one or more words being identified as the first edition command of the plurality of first edition commands:
    perform a first function corresponding to the first edition command to change the first character string into a second character string, and
    control the display to display the second character string as an input character inputted by the user via the first voice input, and
  based on the one or more words not being identified as the first edition command of the plurality of first edition commands:
    identify whether the one or more words are a second edition command of a plurality of second edition commands,
    based on the one or more words being identified as the second edition command of the plurality of second edition commands:
      perform a second function corresponding to the second edition command to change the first character string into a third character string, and
      control the display to display the changed third character string as the input character inputted by the user via the first voice input, and
    based on the one or more words not being identified as the second edition command of the plurality of second edition commands:
      control the display to display the previously defined character as the input character inputted by the user via the first voice input,
wherein the processor is configured to:
  identify whether the one or more words are the first edition command based on a first voice recognition engine; and
  identify whether the one or more words are the second edition command based on a second voice recognition engine which is capable of recognizing more types and numbers of edition commands than the first voice recognition engine.

2. The electronic apparatus according to claim 1, wherein the first edition command includes a command to delete a character included in the first character string.

3. The electronic apparatus according to claim 1, wherein the plurality of second edition commands includes more types of commands or a greater number of commands than the plurality of first edition commands.

4. The electronic apparatus according to claim 1, wherein the processor is configured to:
recognize a second voice input of the user requesting at least one of a volume control, a channel switching or a content based on the second voice recognition engine.

5. The electronic apparatus according to claim 1, wherein the processor is further configured to:
based on a predetermined event, activate a character input mode of the processor, and
obtain the first character string from the first voice input of the user received with the character input mode of the processor activated.

6. The electronic apparatus according to claim 5, wherein the processor is further configured to:
obtain a second voice input of the user, and
identify whether the second edition command is included in the second voice input of the user received with the character input mode of the processor activated.

7. The electronic apparatus according to claim 5, wherein the processor is further configured to:
terminate the activation of the character input mode based on another predetermined event.

8. The electronic apparatus according to claim 5, wherein the predetermined event includes receiving a predetermined user input.

9. The electronic apparatus according to claim 1, wherein, the processor is further configured to:
obtain a third voice input of the user,
identify whether the third voice input of the user includes the first edition command or the second edition command,
based on the third voice input being identified as including the first edition command or the second edition command:
perform the first function or the second function respectively corresponding to the first edition command or the second edition command to change the third character string into a fourth character string, and
identify the fourth character string as the input character inputted by the user via the first voice input without identifying the third character string as the input character inputted by the user via the first voice input.

10. The electronic apparatus according to claim 9, further comprising:
wherein the processor is further configured to:
control the display to display the fourth character string as the input character inputted by the user via the first voice input, and
control the display to not display the text input as the input character inputted by the user via the first voice input.

11. The electronic apparatus according to claim 1, wherein the processor is further configured to:
obtain a fourth character string including the previously defined character from a second voice input; and
identify whether the second voice input includes the first edition command or the second edition command,
based on the second voice input not being identified as including the first edition command or the second edition command:
identify the second character string as the input character inputted by the user via the first voice input.

12. The electronic apparatus according to claim 1, wherein the processor is further configured to:
obtain a second voice input of the user, and
based on the one or more words being identified as the first edition command:
not identify whether the second voice input includes the second edition command.

13. A method of controlling an electronic apparatus, comprising:
obtaining a first character string including a previously defined character and one or more words from a first voice input of a user, and
identifying whether the one or more words are a first edition command of a plurality of first edition commands, in advance, among the plurality of first edition commands and a plurality of second edition commands which are different from the plurality of first edition commands,
based on the one or more words being identified as the first edition command of the plurality of first edition commands:
performing a first function corresponding to the first edition command to change the first character string into a second character string, and
displaying the second character string as an input character inputted by the user via the first voice input, and
based on the one or more words not being identified as the first edition command of the plurality of first edition commands:
identifying whether the one or more words are a second edition command of the plurality of second edition commands,
based on the one or more words being identified as the second edition command of the plurality of second edition commands:
performing a second function corresponding to the second edition command to change the first character string into a third character string, and
displaying the third character string as the input character inputted by the user via the first voice input, and
based on the one or more words not being identified as the second edition command of the plurality of second edition commands:
displaying the previously defined character as the input character inputted by the user via the first voice input,
wherein identifying whether the one or more words are the first edition command comprises identifying whether the one or more words are the first edition command based on a first voice recognition engine, and
identifying whether the one or more words are the second edition command comprises identifying whether the one or more words are the second edition command based on a second voice recognition engine which is capable of recognizing more types and numbers of edition commands than the first voice recognition engine.

14. The method according to claim 13, wherein the first edition command includes a command to delete a character included in the first character string.

15. The method according to claim 13, wherein the plurality of second edition commands includes more types of commands or a greater number of commands than the plurality of first edition commands.

16. The method according to claim 13, wherein the performing the second function corresponding to the second edition command comprises:
recognizing a second voice input of the user requesting at least one of a volume control, a channel switching or a content based on the second voice recognition engine.

17. The method according to claim 13, wherein the obtaining the first character string includes:
based on a predetermined event, activating a character input mode, and
identifying the first character string and the first edition command with regard to the first voice input received with the character input mode activated.

18. The method according to claim 17, wherein the performing the second function corresponding to the second edition command includes identifying whether the second edition command is included in a second voice input received with the character input mode activated.

19. The method according to claim 17, further comprising:
terminating the activation of the character input mode based on another predetermined event.

20. A non-transitory recording medium storing a computer program including a code for performing a control method of an electronic apparatus as a computer readable code, the control method comprising:
obtaining a first character string including a previously defined character and one or more words from a first voice input of a user,
identifying whether the one or more words are a first edition command of a plurality of first edition commands, in advance, among the plurality of first edition commands and a plurality of second edition commands which are different from the plurality of first edition commands,
based on the one or more words being identified as the first edition command of the plurality of first edition commands:
performing a first function corresponding to the first edition command to change the first character string into a second character string, and
displaying the second character string as an input character inputted by the user via the first voice input, and
based on the one or more words not being identified as the first edition command of the plurality of first edition commands:
identifying whether the one or more words are a second edition command of plurality of second edition commands,
based on the one or more words being identified as the second edition command of the plurality of second edition commands:
performing a second function corresponding to the second edition command to change the first character string into a third character string, and
displaying the third character string as the input character inputted by the user via the first voice input, and
based on the one or more words not being identified as the second edition command of the plurality of second edition commands:
displaying the previously defined character as the input character inputted by the user via the first voice input,
wherein identifying whether the one or more words are the first edition command comprises identifying whether the one or more words are the first edition command based on a first voice recognition engine, and
identifying whether the one or more words are the second edition command comprises identifying whether the one or more words are the second edition command based on a second voice recognition engine which is capable of recognizing more types and numbers of edition commands than the first voice recognition engine.

* * * * *